United States Patent [19]

Nylund

[11] Patent Number: 5,100,611
[45] Date of Patent: Mar. 31, 1992

[54] FUEL ASSEMBLY FOR A LIGHT-WAFER NUCLEAR REACTOR

[75] Inventor: Olov Nylund, Västerås, Sweden
[73] Assignee: Abb Atom Ab, Västerås, Sweden
[21] Appl. No.: 625,137
[22] Filed: Dec. 10, 1990
[30] Foreign Application Priority Data
Dec. 15, 1989 [SE] Sweden .............................. 8904229
[51] Int. Cl.⁵ .............................................. G21C 1/04
[52] U.S. Cl. ................................. 376/352; 376/444; 376/443; 376/439
[58] Field of Search ............... 376/352, 365, 444, 443, 376/439

[56] References Cited
U.S. PATENT DOCUMENTS
4,053,359 10/1977 Pennell et al. .................. 376/365
4,826,653 5/1989 Wylund et al. .................. 376/444

Primary Examiner—Brooks H. Hunt
Assistant Examiner—Meena Chelliah
Attorney, Agent, or Firm—Watson, Cole, Grindle & Watson

[57] ABSTRACT

A fuel assembly for a light-water nuclear reactor contains a plurality of vertical fuel rods which are arranged, mutually spaced from each other in the lateral direction, between a bottom tie plate and a top tie plate. The bottom tie plate is provided with through-holes for conducting water through the bottom tie plate and into the spaces between the fuel rods. The through-holes in the bottom tie plate have parts, the centre lines of which are displaced in relation to each other or make an angle with each other.

10 Claims, 6 Drawing Sheets

FUEL ASSEMBLY FOR A LIGHT-WAFER NUCLEAR REACTOR

BACKGROUND OF THE INVENTION

The present invention relates to a fuel assembly for a light-water nuclear reactor comprising a plurality of vertical fuel rods, which are arranged in spaced relationship between a bottom tie plate and a top tie plate, the bottom tie plate being provided with through-holes for conducting water through the bottom tie plate and into the spaces between the fuel rods.

Experience shows that, for example in connection with repair and service of a nuclear reactor, debris may enter, which debris then moves with the water which circulates through the reactor core. The debris may, for example, consist of metal chips (borings) formed in connection with repair of, for example, a steam separator, pieces of metal wire, or other foreign particles which have entered the system from outside. The debris may give rise to abrasion damage, which has serious consequences if the damage arises on parts which are particularly easily damaged, such as fuel rods.

To avoid damage of the above-mentioned kind in pressurized water reactors, it is known to provide the bottom tie plates which already exist below the fuel rod bundle with a large number of holes to enable each bottom tie plate, in addition to each normal function, to function as a debris catcher in the form of a strainer and prevent debris from reaching the fuel rod bundle with control rod guide tubes and spacers.

SUMMARY OF THE INVENTION

According to the present invention, through-holes in the bottom tie plate of a fuel assembly in a pressurized water or boiling water nuclear reactor are designed in a special way, which provides efficient capture of debris, especially if the debris consists of thin, elongated objects, such as pieces of wire and borings. The favourable result is obtained according to the invention by forming the through-holes in the bottom tie plate with parts, the centre lines of which are displaced in relation to each other in the lateral direction or make an angle with each other. As will be clear from the text below, it may be suitable to combine the use of a bottom tie plate according to the invention with another debris catcher to ensure that objects of debris of different shapes are taken care of.

According to a preferred embodiment of the invention, in which through-holes in the bottom tie plate have parts whose centre lines are displaced in relation to each other, a part of a through-hole on the inlet side of the bottom tie plate for the water is common to several parts of through-holes on the outlet side of the bottom tie plate for the water. A part of a through-hole on the inlet side of the bottom tie plate thereby normally has a larger cross section than a part of a through-hole on the outlet side of the bottom tie plate. To increase the water flow through the bottom-tie plate, parts of through-holes in the bottom tie plate may be arranged in open communication with one or more edge sides of the bottom tie plate by way of transverse channels which at each respective edge side have orifices which are arranged in open communication with the spaces between the fuel rods in the same fuel assembly in a boiling water reactor or in the same and adjacent fuel assemblies in a pressurized water reactor. The open communication may advantageously be achieved via vertical recesses in the respective edge side on the bottom tie plate. A further increase of the water flow through the bottom tie plate may be obtained by arranging parts of the same kind of through-holes in the bottom tie plate in open communication with each other via transverse channels.

According to another embodiment of the invention, in which through-holes in the bottom tie plate have parts, the centre lines of which make an angle with each other, a through-hole is arranged with a pocket in which one part changes into another part. To reduce the risk of clogging of the bottom tie plate, a part of the through-hole which extends from one side of the bottom tie plate may be arranged in open communication with at least two parts of through-holes which extend from the other side of the bottom tie plate. This results in redundant flow paths and a large open volume in the interior of the bottom tie plate.

The invention will be explained in greater detail, by way of example, with reference to the accompanying drawings.

BRIEF DESCRIPTION OF THE DRAWINGS

In FIGS. 1-3, 1 designates a fuel channel with substantially square cross section. The fuel channel surrounds, with no significant play, an upper square portion of a bottom part 2 with a circular, downwardly-facing inlet opening 3 for cooling water and moderator water. In addition to supporting the fuel channel 1, the bottom part 2 also supports a supporting plate 4. At the lower part the fuel channel 1 has a relatively thick wall portion which is fixed to the bottom part 2 and the supporting plate 4 by means of a plurality of horizontal bolts, indicated by means of dash-dotted lines 5. By means of a hollow support member 7 of cruciform cross section, the fuel channel 1 is divided into four vertical tubular parts 6 having at least substantially square cross section. The support member 7 is welded to the four walls 1a, 1b, 1c and 1d of the fuel channel 1 and has four hollow wings 8. The central channel formed by the support member is designated 32 and is connected at its lower part to an inlet tube 9 for moderator water. Each tubular part 6 contains a bundle 25 of twenty-five fuel rods 10. The rods are arranged in a symmetrical lattice in five rows each containing five rods. Each rod is included in two rows perpendicular to each other. Each bundle is arranged with a bottom tie plate 11, a top tie plate 12 and a plurality of spacers 13. A fuel rod bundle 25 with a bottom tie plate 11, a top tie plate 12, spacers 13 and a casing part 6 forms a unit which in this application is referred to as a fuel assembly, whereas the device comprising four such fuel assemblies shown in FIGS. 1-3 is referred to as a composed fuel assembly. In the composed fuel assembly the four bottom tie plates 11 are supported by the supporting plate 4 and are partially each inserted into a corresponding square hole 14 therein. In each fuel assembly at least one of the fuel rods is provided with relatively long, threaded end plugs 33 and 34 of solid cladding material, the lower end plug 33 being passed through the bottom tie plate 11 and provided with a nut 15 and the upper end plug 34 being passed through the top tie plate 12 and provided with a nut 16. In the embodiment shown the centre rod 26 is formed in this way. This rod also serves as spacer holder rod. An upper end portion of the fuel channel 1 surrounds a cruciform lifting plate 17 with four horizontal arms 18, 19, 20 and 21, which extend from a common central portion. At the outer end each arm has an arrowhead-like portion 22, which in each respective corner of the fuel channel 1 makes contact with the inner wall surface of the fuel channel 1. A lifting handle 23 is fixed to the arms 20 and 21. The lifting plate 17 and the handle 23 together form a steel lifting member cast in one piece. The lifting plate 17 is fixed to the support member 7 by inserting four vertical bars 28 into respective wings 8 of the support member 7 and welding them thereto. At the upper end each bar 28 has a vertical, bolt-like portion 29 which is passed with a play through a corresponding hole in the mid-portion of the lifting plate 17 and provided with a nut 30. As will be clear from the figures, the fuel channel 1 is provided with indentations 31, intermittently arranged in the longitudinal direction, against which the support member 7 is welded.

In FIG. 4, which shows three adjacently positioned fuel assemblies for a pressurized water reactor, the vertical fuel rods are designated 42, the rectangular top tie plates 43, the rectangular bottom tie plates 44 and the spacer members by means of which the fuel rods are positioned are designated 45. Guide tube members 46 for control rod pins are fixed at their upper ends to the top tie plates 43 and at the lower ends to the bottom tie plates 44. In addition, they are fixed to the spacer members 45.

The bottom tie plate according to FIGS. 6 and 7 have through-holes 50 for conducting water through the bottom tie plate. The holes have parts 50a and 50b, the centre lines of which are displaced in relation to each other. One part 50a of a through-hole on the inlet side 51 of the plate for the water is common to several parts 50b of through-holes on the outlet side 52 of the plate. One part 50a of a through-hole on the inlet side 51 of the bottom tie plate has a larger cross section than one part 50b of a through-hole on the outlet side 52 of the bottom tie plate. Parts 50a of through-holes are in the exemplified case—but need not be so—arranged in open communication with one or more edge sides 53 by way of transverse channels 54 which at the edge have orifices 55 which are arranged in open communication with the spaces between the fuel rods in the same fuel assembly for a boiling water reactor or in the same and adjacent fuel assemblies in a pressurized water reactor. The open communication is achieved by means of recesses 56 in the edge side 53 of the bottom tie plate. When the bottom tie plate according to the FIGS. 6 and 7 is used in a fuel assembly for a boiling water reactor, for example in the fuel assembly shown in FIG. 1, the surface 57 makes contact with the supporting plate 4 and the edge side 53 makes contact with the casing part 1, which means that the water which has passed through the orifices 55 flows up to the space between the fuel rods 10. The water which passes through the holes 50a and 50b also flows up to the space between the fuel rods 10. In FIG. 1—for reasons of space—the holes 50a and 50b are drawn schematically as holes of a conventional kind. The holes for the end plugs of the fuel rods in the bottom tie plate are designated 59. When the bottom tie plate according to FIGS. 6 and 7 is used in a fuel assembly for a pressurized water reactor, for example the fuel assembly shown in FIG. 4, the bottom tie plate has no holes (59) for fuel rods and the edge side 53 makes contact with an edge side in another fuel assembly of the same kind. Nor do the recesses 56 extend all the way down to the lower edge of the edge side 53 but two adjacent bottom tie plates make contact with each other along their entire horizontal extension along an edge at the bottom of each edge side. The water which has passed through the orifices 55 thereby flows via the recesses 56 up to the spaces between the fuel rods 42 above the bottom tie plate and in spaces between adjacent fuel assemblies since there are no partitions between the fuel assemblies. Parts 50a of through-holes are also arranged in the illustrated case in open communication with each other via transverse channels 58.

Figure 1:
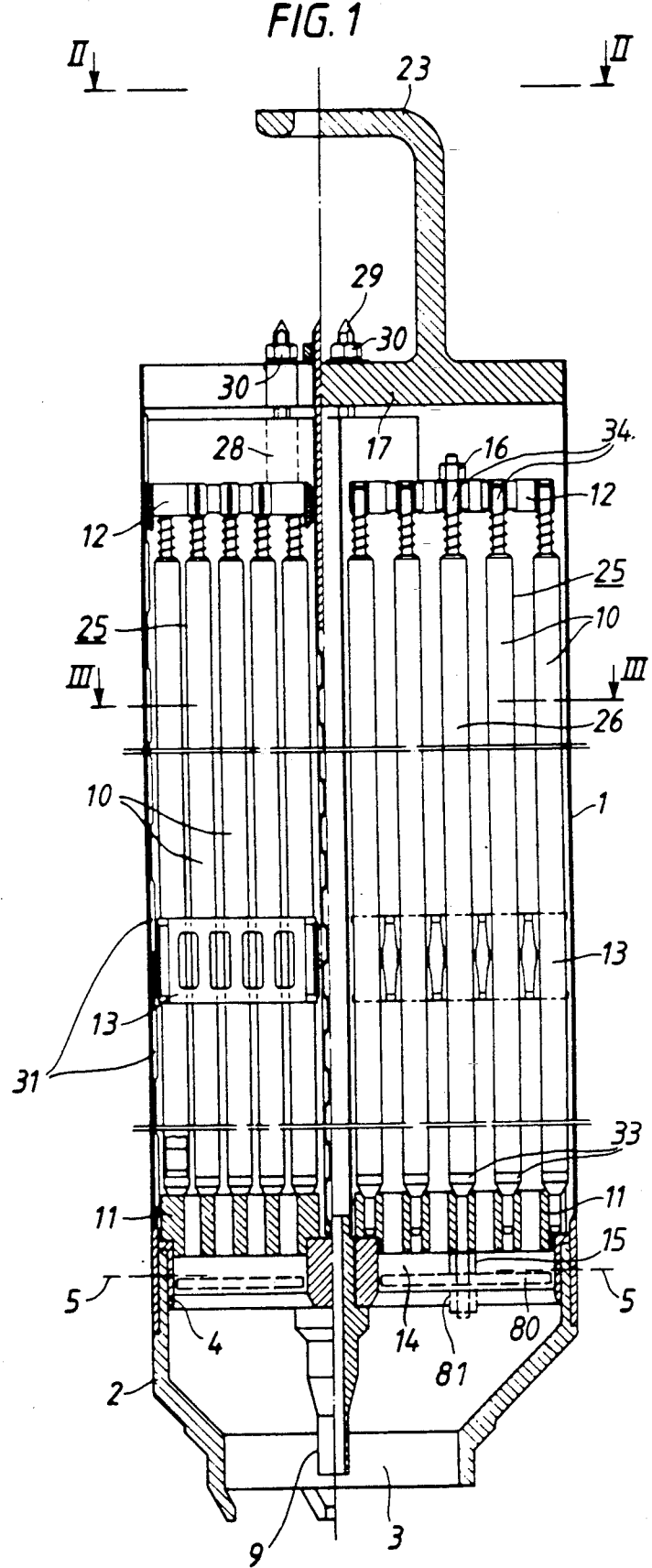
FIG. 1 shows a vertical section through the line I—I in FIG. 2 of an embodiment of a composed fuel assembly for a boiling water reactor composed of four fuel assemblies according to the invention with a bottom tie plate on each fuel assembly.
Figure 2:
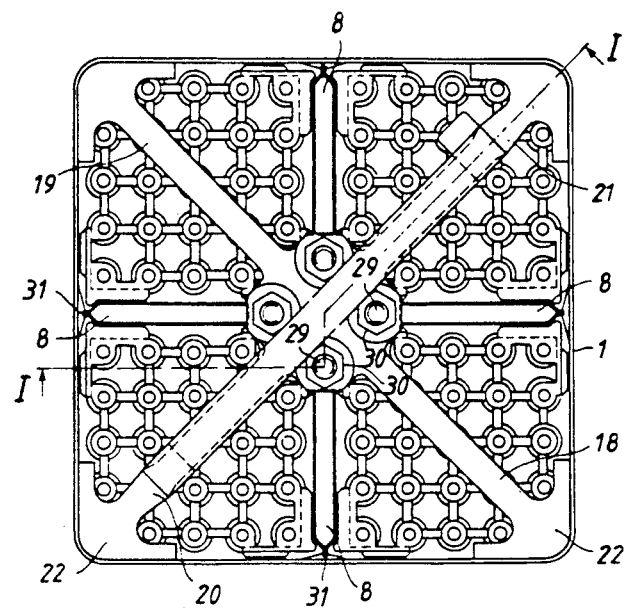
FIG. 2 is a view of the same composed fuel assembly perpendicular to a horizontal plane through the line II—II in FIG. 1.
Figure 3:
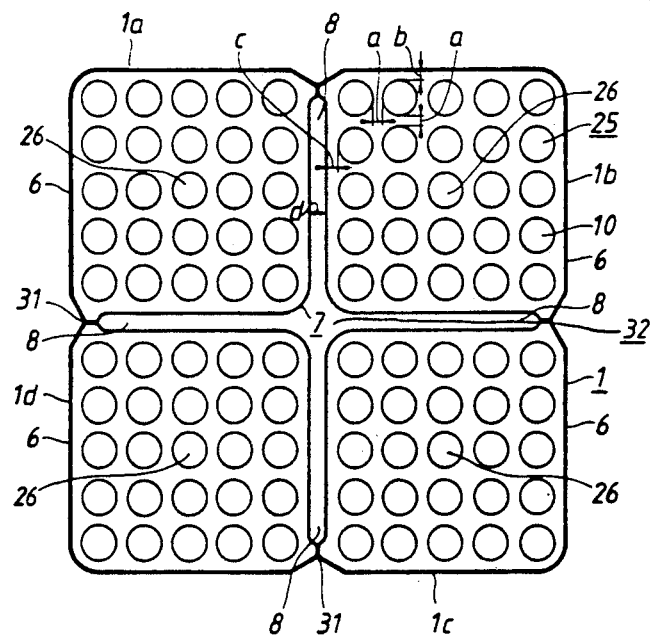
FIG. 3 is a horizontal section through the line III—III in FIG. 1.
Figure 6:
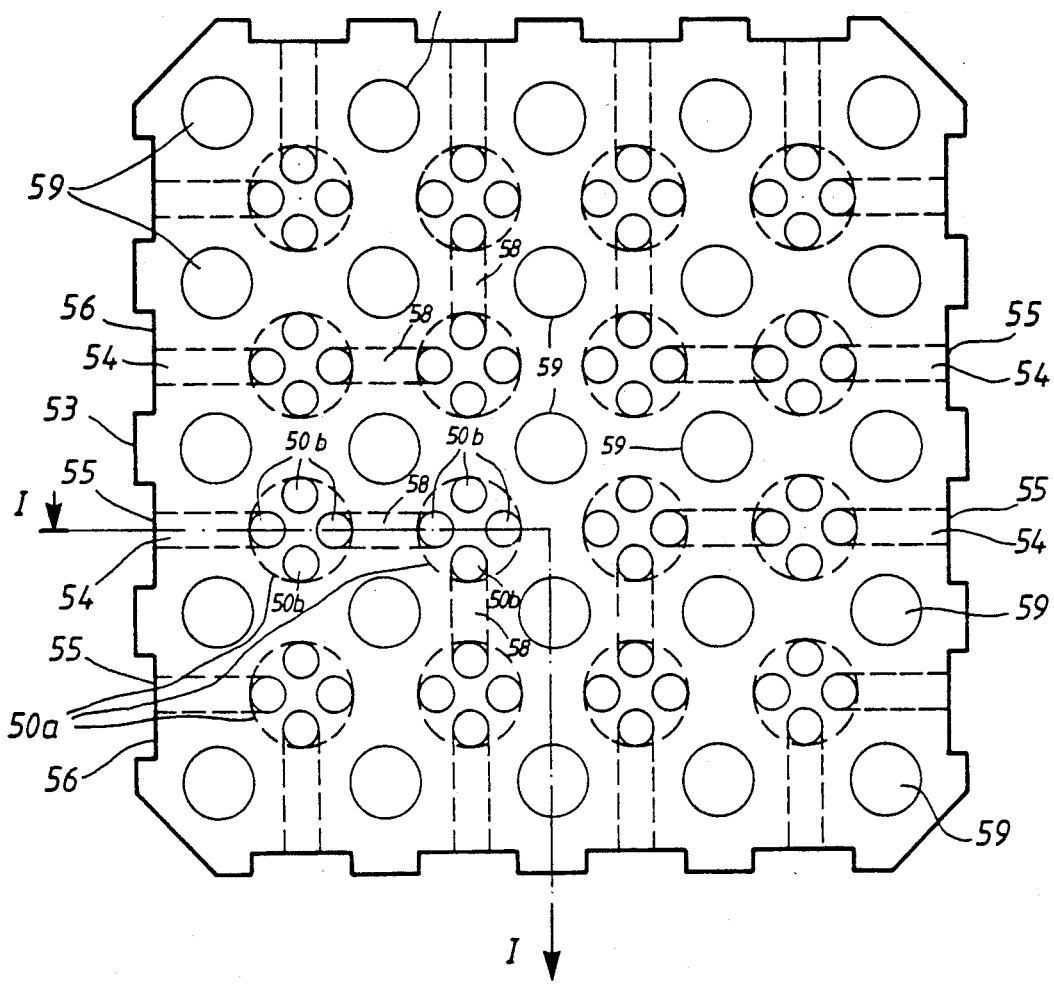
FIG. 6 is a view from above of a bottom tie plate for a fuel assembly according to FIG. 1 and in modified form for a fuel assembly according to FIG. 4 on an enlarged scale.
Figure 7:
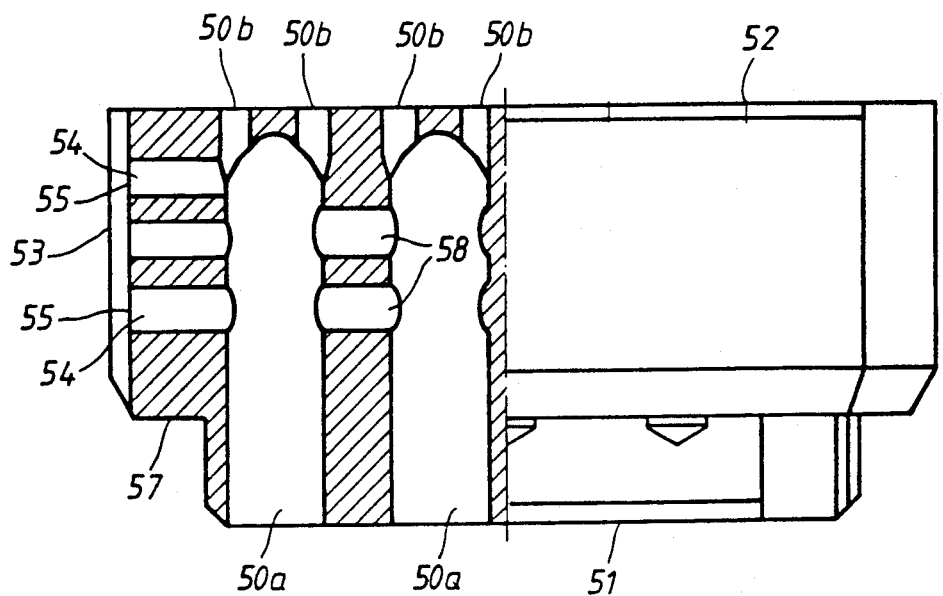
FIG. 7 shows the same bottom tie plate, partly in vertical section through the line I—I in FIG. 6, partly in side view.
Figure 8:
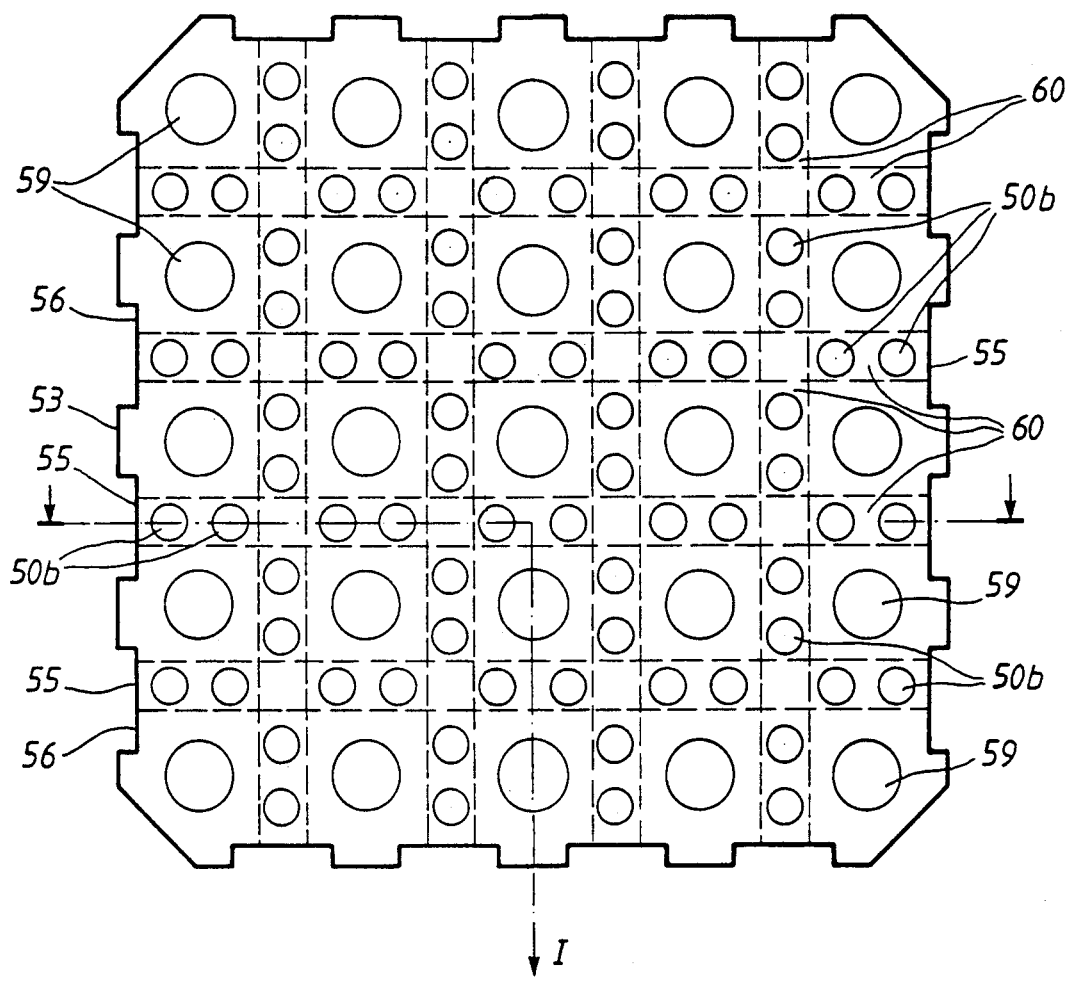
FIG. 8 shows a view from above of another bottom tie plate for a fuel assembly according to FIG. 1 and in modified form for a fuel assembly according to FIG. 4 on an enlarged scale.
Figure 9:
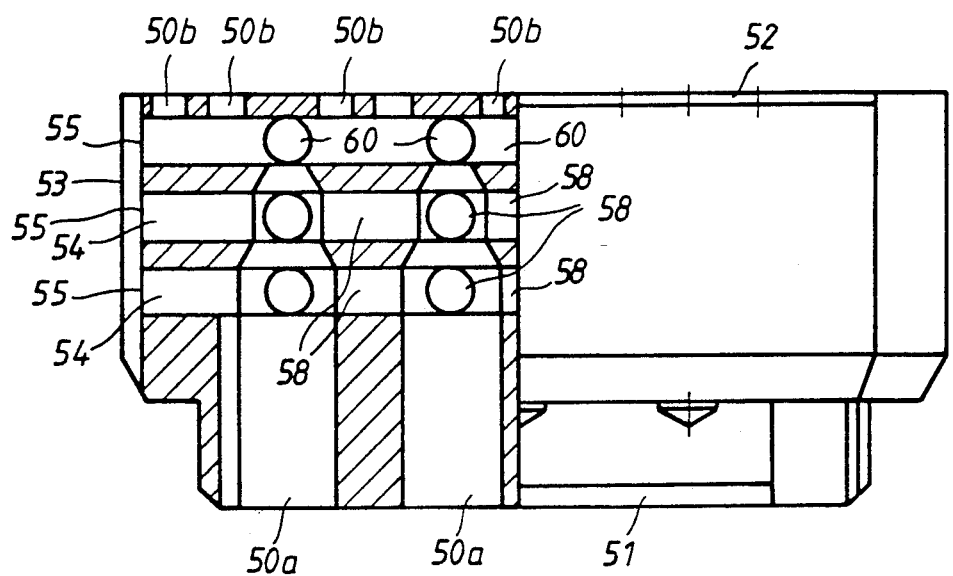
FIG. 9 shows the same bottom tie plate, partly in vertical section through the line I—I in FIG. 8, partly in side view.

The embodiment of the bottom tie plate according to FIGS. 8 and 9 differs from the embodiment according to FIGS. 6 and 7 in that it has several transverse channels. In addition to transverse channels 54 which connect parts 50a of through-holes with edge sides 53 and transverse channels 58 which connect parts 50a with each other, there are transverse channels 60 which connect parts 50b of through-holes with each other and with edge sides 53. The bottom tie plate according to FIGS. 8 and 9 may be used in the same way as the bottom tie plate according to FIGS. 6 and 7, i.e. as such in a fuel assembly according to FIG. 1 and in modified form without holes (59) for fuel rods and with recesses (56) which are shut off at the bottom in a pressurized water reactor.

Figure 4:
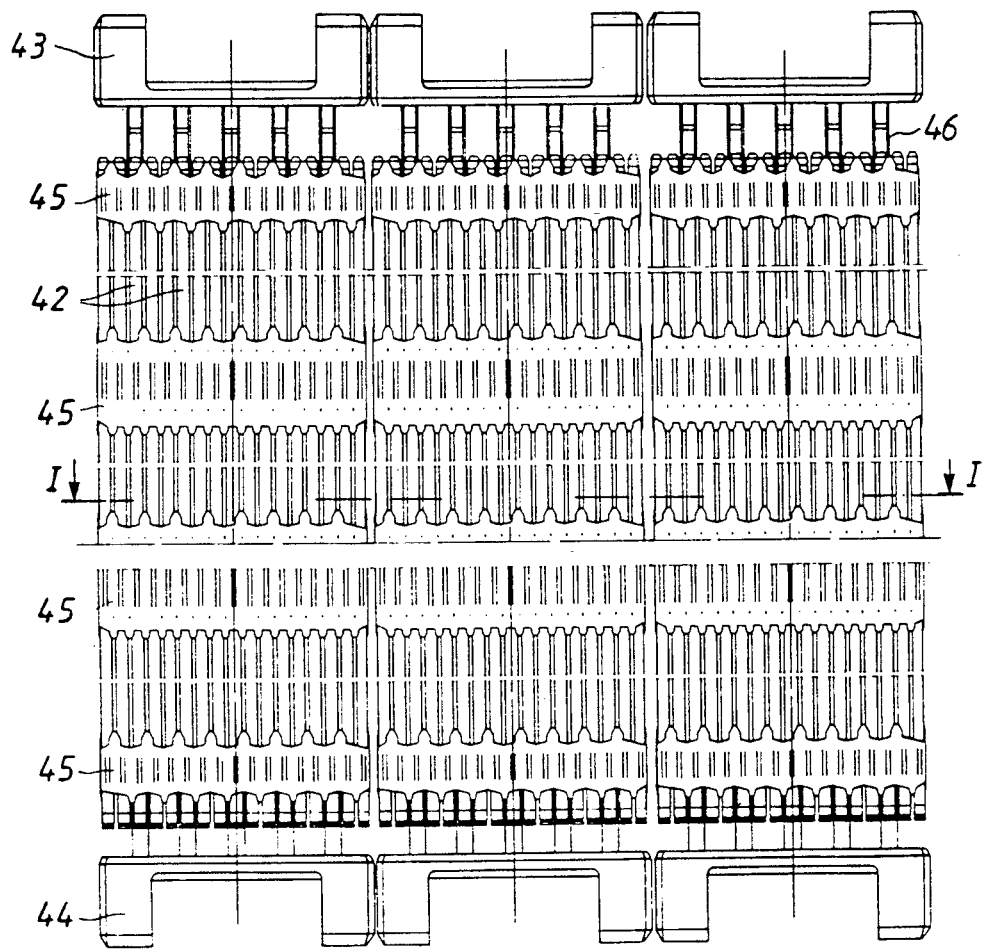
FIG. 4 is a side view of an embodiment of a fuel assembly for a pressurized water reactor according to the invention together with two adjacent fuel assemblies of the same kind.
Figure 5:
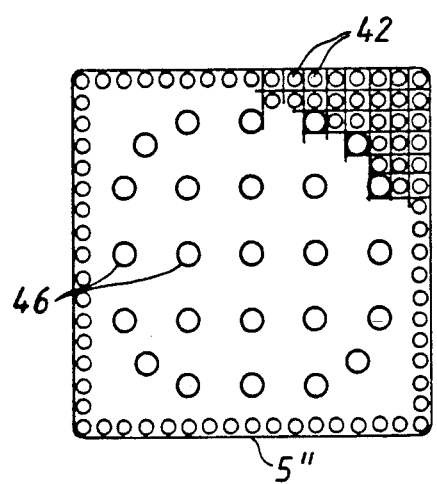
FIG. 5 is a horizontal section along I—I through a fuel assembly in FIG. 4.
Figure 10:
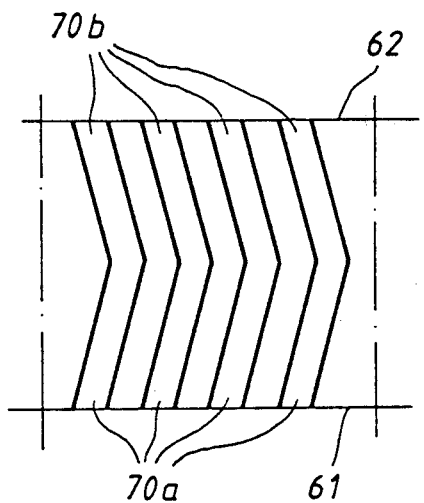
FIGS. 10, 11 and 12 show vertical sections of parts of three different bottom tie plates for a fuel assembly according to FIG. 4 and in modified form for a fuel assembly according to FIG. 1.
Figure 11:
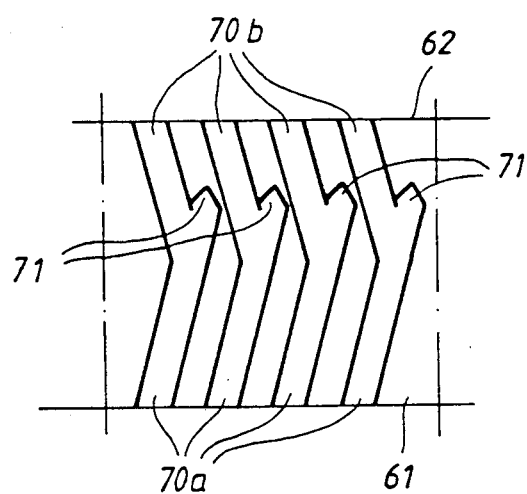
Figure 12:
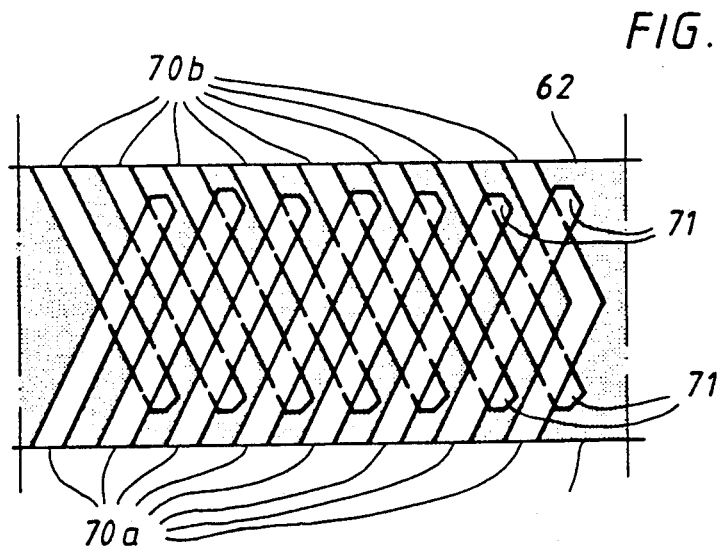

In the bottom tie plates according to FIGS. 10-12, the inlet side for the water is designated 61 and the outlet side, facing the fuel rods, for the water is designated 62. The through-holes in the bottom tie plate according to FIG. 10 have parts 70a and 70b, the centre lines of which make an angle with each other. In the embodiment according to FIG. 11 the through-holes are arranged with a pocket 71 for capturing debris. In the bottom tie plate according to FIG. 12, a part which extends from one side, for example a part 70a extending from the side 61, is arranged in open communication with two or three parts which extend from the other side of the bottom tie plate, i.e. two or three parts 70b extending from the side 62. The bottom tie plate is also provided with pockets 71. A bottom tie plate of the kind illustrated in FIG. 12 has an exceedingly large open inner volume. The bottom tie plates according to FIGS. 10-12 are used in the illustrated embodiment in a fuel assembly according to FIG. 4. When using it in a fuel assembly according to FIG. 1, it is provided with holes corresponding to the holes 59 in the bottom tie plates according to FIGS. 6-9, for end plugs for fuel rods 10. Such holes are not visible in the shown cross section.

It may be suitable to combine the use of the described bottom tie plates with the use of a separate strainer means with a low flow resistance to water to ensure that objects of debris with different shapes are captured and prevented from entering sensitive parts of the fuel assembly. The use of such a separate strainer means in the form of a strainer plate 80 is shown in dashed lines in FIG. 1. The strainer plate may, for example, be fixed to the end plug 33 which is extended with an extra nut 81.

I claim:

1. A fuel assembly for a light-water nuclear reactor which comprises
   a bottom tie plate,
   a top tie plate, and
   a plurality of spaced fuel rods which extend between said bottom tie plate and said top tie plate,
   said bottom tie plate defining a bottom inlet side and a top outlet side and having a plurality of through-holes which extend from said bottom inlet side to said top outlet side to enable water to flow therethrough and between said fuel rods, said through-holes being configured to define a plurality of flow channel parts in the flow direction which have center lines that are non-collinear.

2. A fuel assembly according to claim 1, in which said through-holes in the bottom tie plate define flow channel parts whose center lines are displaced in relation to each other in a lateral direction, and wherein a flow channel part of a through-hole at the inlet side of the bottom tie plate is common to several flow channel parts of through-holes at the outlet side of the plate.

3. A fuel assembly according to claim 1, in which said through-holes in the bottom tie plate define flow channel parts whose center lines are displaced in relation to each other in a lateral direction, and wherein a flow channel part of a through-hole on the inlet side of the bottom tie plate has a larger cross section than a flow channel part of a through-hole on the outlet side of the bottom tie plate.

4. A fuel assembly according to claim 2, wherein the flow channel parts of through-holes in the bottom tie plate are arranged in open communication with at least one edge side of the bottom tie plate by way of transverse channels which at the edge side have orifices which are arranged in open communication with spaces between the fuel rods in the same fuel assembly or in the same and adjacent fuel assemblies.

5. A fuel assembly according to claim 4, including vertical recesses at the side edge of the bottom tie plate to communicate the orifices of the transverse channels at the edge side of the bottom tie plate with spaces between the fuel rods.

6. A fuel assembly according to claim 2, including transverse channels to communicate flow channel parts of like through-holes in the bottom tie plate.

7. A fuel assembly according to claim 1, in which the centre lines of the flow channel parts extend at an angle with each other, and wherein a through-hole includes a pocket in which one flow channel part changes into another flow channel part.

8. A fuel assembly according to claim 1, in which the center lines of the flow channel parts extend at an angle with each other, and wherein one flow channel part which extends from one side of the bottom tie plate is arranged in open communication with at least two flow channel parts of through-holes which extend from the other side of the bottom tie plate.

9. A fuel assembly according to claim 1, including a vertical casing which surrounds said bottom tie plate, said top tie plate and said fuel rods, and which defines a square cross section.

10. A fuel assembly according to claim 9, including spacer means within said vertical casing and between said bottom and top tie plates for maintaining the positioning of said fuel rods relative to one another.

* * * * *